June 4, 1940.    W. H. BENNETT    2,202,823
RECTIFICATION SYSTEM
Filed Aug. 10, 1938    3 Sheets-Sheet 1

INVENTOR.
WILLARD H. BENNETT
BY John B. Brady
ATTORNEY

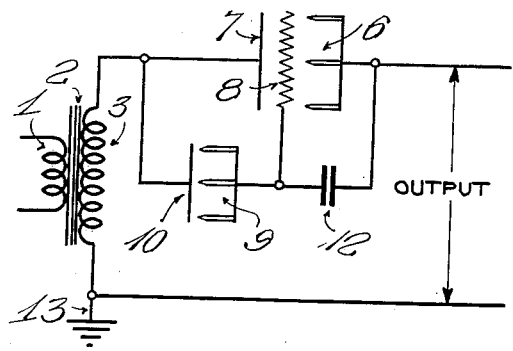
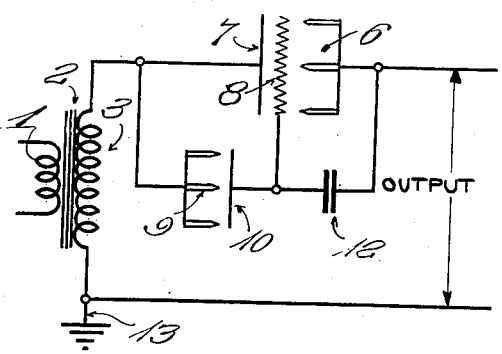
FIG. 8  FIG. 9
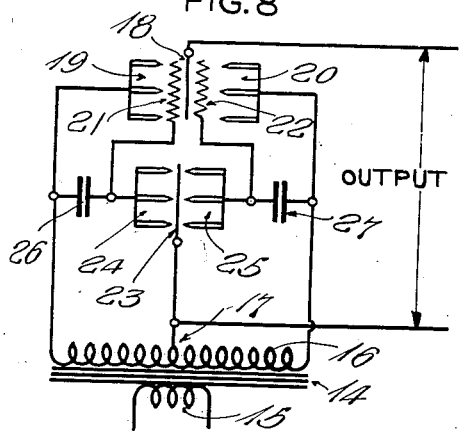
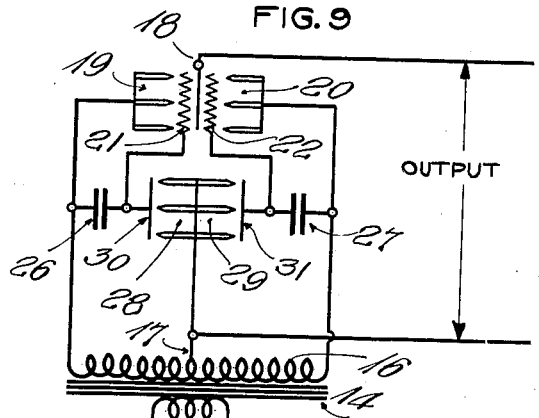
FIG. 10  FIG. 11
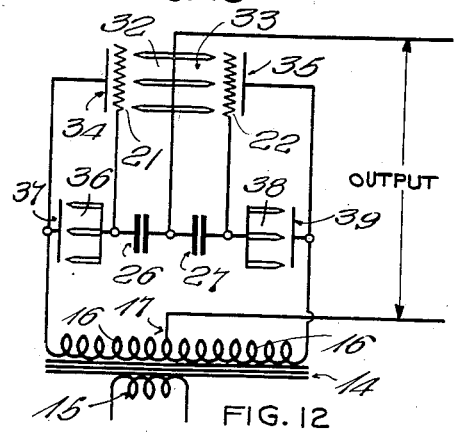
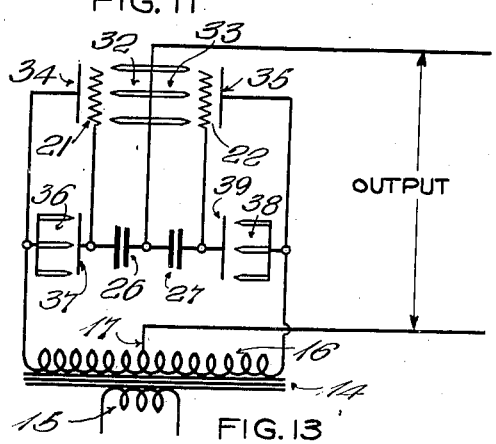
FIG. 12  FIG. 13
*INVENTOR.*
WILLARD H. BENNETT
BY John B. Brady
*ATTORNEY*

June 4, 1940.                    W. H. BENNETT                    2,202,823
                              RECTIFICATION SYSTEM
                              Filed Aug. 10, 1938                 3 Sheets-Sheet 3

INVENTOR.
WILLARD H. BENNETT
BY John B. Brady
ATTORNEY

Patented June 4, 1940

2,202,823

UNITED STATES PATENT OFFICE 2,202,823

RECTIFICATION SYSTEM

Willard H. Bennett, Columbus, Ohio, assignor to Electronic Research Corporation, Newark, Ohio, a corporation of Ohio Application August 10, 1938, Serial No. 224,217

23 Claims. (Cl. 175—363)

My invention relates broadly to an improved rectification system for alternating current and more particularly to a method and apparatus for producing rectified current from high voltage alternating current.

One of the objects of my invention is to provide a method for rectifying high voltage alternating current for producing rectified current by employing the inequality of magnitude of positive and negative currents in electric discharges from points to a target at substantially atmospheric pressures.

Still another object of my invention is to provide a system of rectification in which an arrangement of discharge points in spacial relation to a target at atmospheric pressures is electrically biased from the applied energy to secure rectification of applied energy.

A further object of my invention is to provide an arrangement of electric discharger operative at approximately atmospheric pressures and having an auxiliary electric discharger also operative at approximately atmospheric pressures connected therewith for applying required biasing potential to the main electric discharger for conditioning the main discharger to operate as a rectifier of applied energy.

A still further object of my invention is to provide a high voltage rectification system employing an electric discharge system operative at approximately atmospheric pressures having means for automatically preventing arc-back during rectification of fluctuating currents.

A further object of my invention is to provide a rectification system of the class described which is readily adaptable to multiple unit arrangement and cascade operation.

Figure 1:
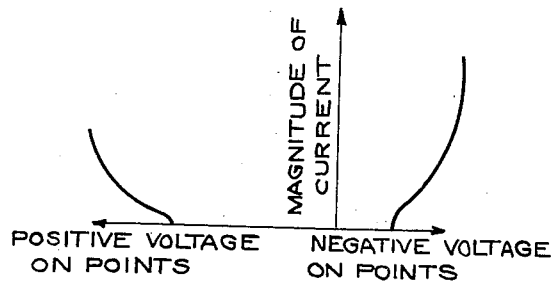
Figure 3:
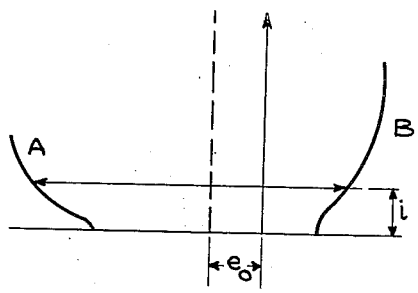
Figure 2:
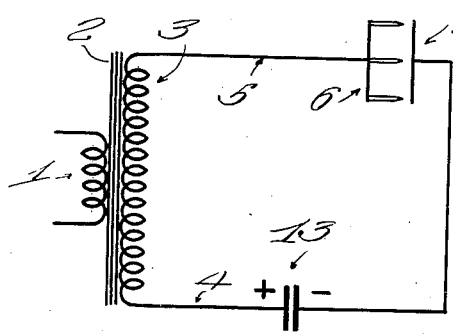
Figure 4:
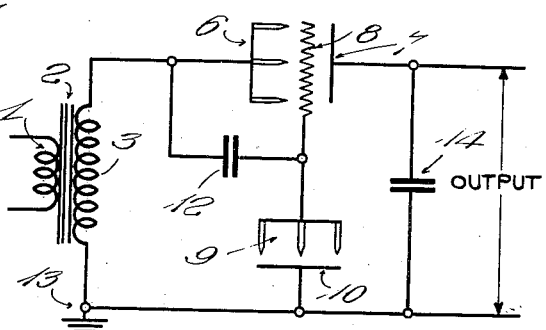
Figure 5:
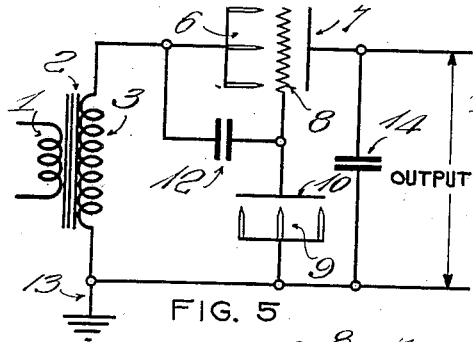
Figure 14:
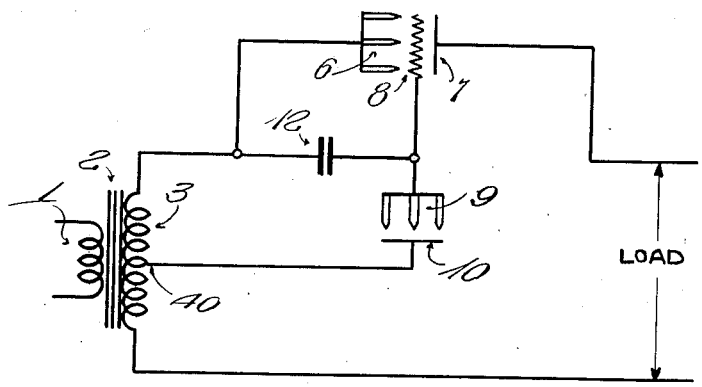
Figure 15:
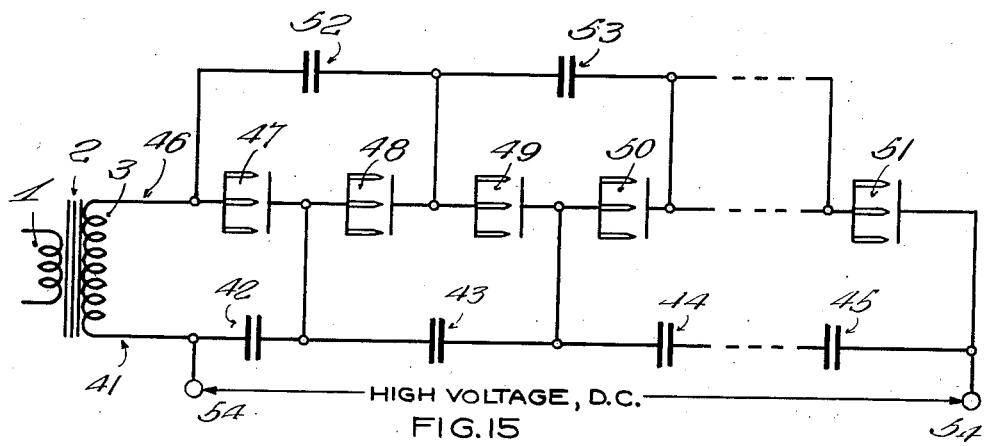
Figure 16:
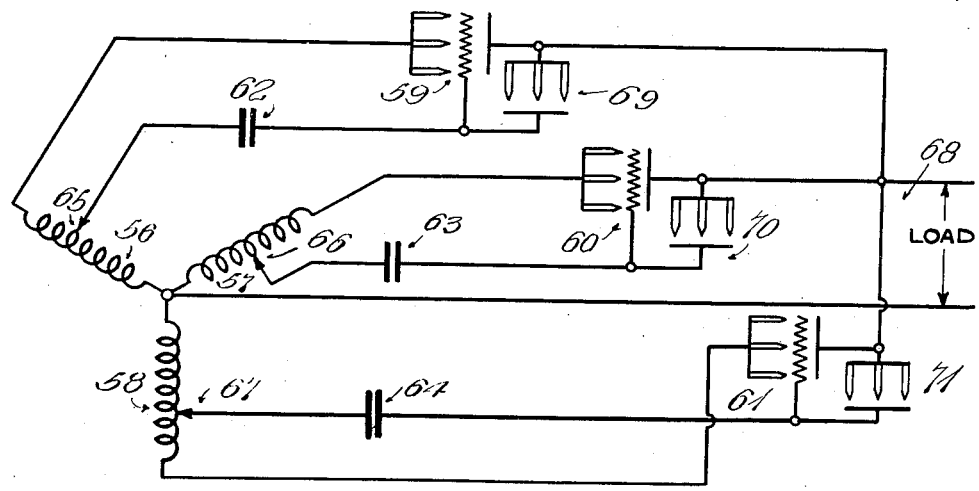

Other and further objects of my invention are the provision of an improved and simplified high voltage rectification system which will remain at relatively low operating temperature while in use and offer minimum electrical loss, as set forth more fully in the specification hereinafter following by reference to the accompanying drawings in which:

Figure 1 shows the characteristic current from point or edge discharge in air as a function of the applied potential difference between the emitter and the target electrode; Fig. 2 shows a simple electric circuit for production of a D. C. potential difference using the discharge from points or edges; Fig. 3 shows the characteristic current passing in the circuit of Fig. 2 as a function of the potential difference across the transformer winding; Fig. 4 shows a rectifier circuit including a principal rectifier and an auxiliary discharger for delivering a biasing component to the principal rectifier; Fig. 5 illustrates a modified arrangement for the auxiliary discharger disclosed in Fig. 4; Figs. 6, 7, 8 and 9 show modified arrangements of the biasing circuit with respect to the principal discharger; Figs. 10, 11, 12 and 13 show modified arrangements of full wave rectifying circuits embodying my invention; Fig. 14 shows a further modified form of auxiliary discharge circuit for biasing the grid of the principal rectifier; Fig. 15 shows a circuit arangement for the cascade operation of a multiple number of rectifier circuits; and Fig. 16 illustrates the rectification system of my invention applied to a circuit arrangement for rectifying polyphase alternating currents.

The electrical industry has recognized the desirability of replacing high tension systems with high voltage direct current distribution. The advantages of such systems are manifold, namely, line losses are less, maintenance costs are less, underground cable can be used economically, switching is greatly simplified because it is not necessary to synchronize between lines before connecting. The great difficulty in all these years which has prevented the electrical industry from changing over to direct current has been the inability up to the present to make rectifiers, the cost of which to install and to maintain was low enough.

My invention is directed to an improved high voltage rectification system which makes use of a three-electrode arrangement at approximately atmospheric pressure, utilizing the electric discharge from points or edges towards a target electrode and wherein selected bias potential is applied between the points or edges and the next adjacent electrode serving as grid by means either of an auxiliary rectifier operating in a manner similar to the operation of the principal rectifier or by means of the utilization of the discharge from the primary emitters themselves towards the grid electrode, or by means of the discharge which can be made to occur from parts of the grid electrodes back towards parts of the emitter electrodes. The principal rectifier includes the following three electrodes; first, an emitter or point; secondly, a grid which is held at a steady direct current potential difference from the emitter, and thirdly, a plate or collector. The direct current potential difference between the grid and the emitter or point may be secured in a variety of ways. The discharge from points is not symmetrical with respect to polarity. For a given magnitude of potential difference between points and target, more current flows when the points are negative, than when the points are positive. The current is a function of the applied potential. For a given magnitude of current, the points must swing to a greater positive potential than the negative potential required for the same magnitude of current.

The arrangement of electrodes may be made to function as a rectifier when one of the electrodes is charged positively with respect to the discharge points and the external circuit connected therewith will pass current only in the one direction up to such voltages that the maximum negative field transmitted through the grid from the target electrode to the discharge points does not exceed the value at which positive emission sets in from the discharge points. I arrange the characteristics of the external circuit of the rectification system and dispose an auxiliary rectifier therein in such manner that the electrode adjacent the emitter of the main rectifier may be maintained at a steady or very nearly steady positive potential with respect to the emitter. I provide a circuit arrangement for automatically preventing arc-back in the high voltage rectification system. My invention has numerous applications in circuits such as full wave rectifiers, potential doublers, inverters, cascade high voltage rectifier arrangements, and in other high voltage circuits where the use of electron tubes is either expensive or impractical.

Referring to the drawings in more detail, the characteristics of the rectification system of my invention are shown in Fig. 1 by the curves, wherein the magnitude of the current which passes in a discharge component in an electrical circuit embodying my invention is represented as a function of the voltage. The magnitude of the current is plotted as ordinates while the positive voltage on the discharge points and the negative voltage on the discharge points is plotted as abscissa to the left and right respectively. It is to be noted that the current which passes when the discharge points are negative has a greater magnitude than that of the current which passes at the same voltage when the points are positive. Likewise, the voltage required to draw any given negative current is smaller in magnitude than the voltage needed to draw a positive current of the same magnitude.

Fig. 2 schematically shows a rectification circuit utilizing self-biasing discharge components as will be hereinafter described in detail. Reference character 1 designates the input circuit to the high voltage rectifier constituted by a primary winding of transformer 2. The secondary winding of transformer 2 is indicated at 3 having one end 4 connected to the condenser 13 and the other end 5 connected to the emitting points or discharge electrode 6. The discharge electrode 6 comprises a multiplicity of discharge points directed toward a target electrode 7. In the operation of the circuit of Fig. 2, when the voltage across the transformer secondary is gradually increased, more current will pass during those half-cycles when the points are negative than when positive, and so the condenser becomes charged at the polarity shown. Continued application of transformer voltage produces a condition where as much current passes one way as in the opposite way on successive half-cycles. This condition obtains when the condenser has an average voltage equal approximately to $e_0$ (see Fig. 3). This voltage is the average of the voltages at points A and B on the positive and negative branches of the characteristic curves, which are the voltages across the discharge component needed to draw the equal and opposite instantaneous currents, $i$, at peak voltages. Strictly speaking, the voltages A and B are those for which the integrated currents are the same, but this differs by a factor of very low order if the condenser used has sufficient capacity to keep the ripple to a small percentage of the D. C. voltage on the condenser.

In Fig. 4 I have shown a control electrode 8 interposed between discharge electrode 6 and target electrode 7. The control electrode 8 has a bias potential impressed thereon by means of the auxiliary rectifier which includes discharge electrode 9 and target electrode 10 connected as illustrated. The potential supplied to the auxiliary rectifier is obtained from the secondary of transformer 2 through winding 3 from which an applied alternating voltage E is obtained. The applied alternating voltage E is substantially all transmitted through the condenser 12 and appears as a potential difference across discharge electrode 9 and target electrode 10. On either or both half cycles of the alternating current, the emitter 9 may discharge, but since the discharge characteristic is asymmetric, more current flows when discharge electrode 9 is negative than when it is positive. This difference in current leaves a charge on the condenser 12, and so a potential difference across condenser 12 is built up which holds the control electrode 8 of the main rectifier at a steady or very nearly steady positive difference with respect to the emitter 6. The rectifier circuit is indicated as connected to ground at 13. I provide a condenser 14 across the output of the rectifier functioning as a filter condenser for smoothing out the rectified current. The circuit 6, 7, 8, functions as a rectifier as soon as the grid 8 becomes positive with respect to the emitter 6, and will pass current only in the one direction, up to such voltages that the maximum negative field transmitted through condenser 12 to discharge points 6 from target 7 does not exceed the value at which positive emission sets in from discharge points 6. The auxiliary rectifier circuit maintains the grid 8 of the main rectifier positive with respect to the emitter 6.

In Fig. 5 I have shown a rectification system similar to the rectification system shown in Fig. 4 except that the connection of the auxiliary rectifier with respect to the main rectifier is shown in reverse order, that is, the target electrode 10 is connected to control electrode 8 and the discharge electrode 9 is connected to one end of secondary winding 3. The control electrode 8 of the principal rectifier 6, 8, 7 is, in this arrangement, maintained at a steady negative potential. The principal rectifier produces rectified direct current at a high positive potential from ground which is smoothed out by means of filter condenser 14. The rectifier circuits of Figs. 4 and 5 may be operated without the smoothing condensers 14 in circuit, in which case rectified discontinuous D. C. is obtained.

Figure 6:
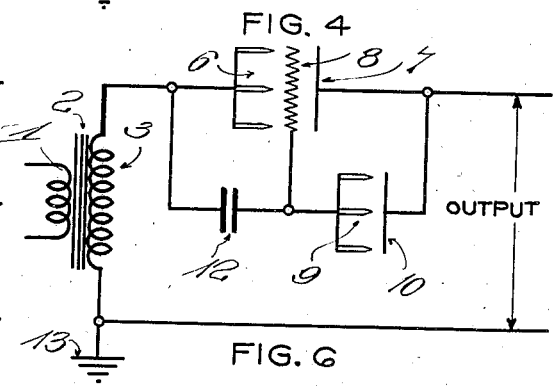

In Fig. 6 I have illustrated an arrangement of the biasing rectifier circuit in which the discharge electrode 9 of the auxiliary rectifier connects to the control electrode 8 of the principal rectifier while the target 10 of the auxiliary rectifier connects with the target 7 of the principal rectifier. The auxiliary rectifier is thus directly associated with one of the high potential delivery leads and a smoothing condenser is not used. The biasing potential difference between the control grid 8 and the emitter 6 is maintained by a small reversed current coming from the load and consequently this class of circuit does not give pure direct current.

Figure 7:
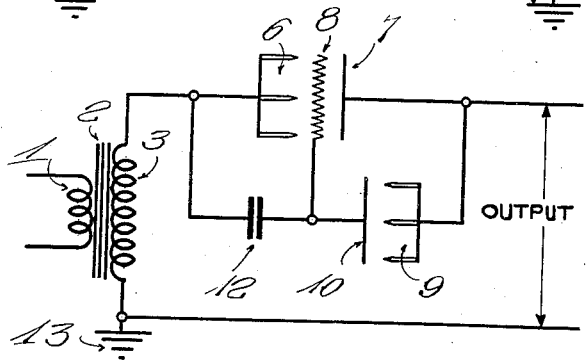

As illustrated in Fig. 7, I may employ the auxiliary rectifier in reverse order, that is, the target electrode 10 may be connected to the control electrode 8 of the principal rectifier and the discharge electrode 9 may be connected to the target electrode of the principal rectifier.

In Fig. 8 I have shown the auxiliary rectifier disposed in a wholly different relation with respect to the principal rectifier, that is, the auxiliary rectifier is arranged in shunt with the control electrode 8 and the target electrode 7 of the principal rectifier, and wherein one terminal of secondary winding 3 connects to target electrode 7 on the input side of the principal rectifier. The output side of the principal rectifier includes a connection to discharge electrode 6. In the arrangement shown in Fig. 8, the auxiliary rectifier has its discharge electrode 9 connected to control electrode 8 and its target electrode 10 connected to target electrode 7 while condenser 12 connects across control electrode 8 and discharge electrode 6.

As shown in Fig. 9, the position of the auxiliary rectifier may be reversed and target electrode 10 connected to control electrode 8 and discharge electrode 9 connected to target electrode 7.

Figs. 10, 11, 12 and 13 show various arrangements of full wave rectifying circuits. The full wave rectifier includes input transformer 14 having primary winding 15 and secondary winding 16 tapped at 17 providing one side of the output circuit of the full wave rectifier.

In Figs. 10 and 11 the principal rectifier includes a common target 18 which connects to one side of the output circuit. The common target 18 coacts with beams from two sets of emitters indicated at 19 and 20. Control electrodes 21 and 22 are provided for respectively controlling the beams from emitters 19 and 20 with respect to target 18. The biasing components for the symmetrical portions of the principal rectifier are secured from symmetrically arranged auxiliary rectifiers which include a common target 23 connected to tap 17 of secondary winding 16 and sets of discharge electrodes 24 and 25 connected to control electrodes 21 and 22 of the principal rectifier. The potential on the control electrodes 21 and 22 is held at an approximately steady positive potential. Condensers 26 and 27 serve to steady the positive potential applied to the control electrodes 21 and 22.

In the arrangement illustrated in Fig. 11, the auxiliary rectifier is modified to include a common emitter constituted by discharge electrodes 28 and 29 coacting with separate targets 30 and 31. The common emitter is connected to the taps 17 of secondary winding 16. Control electrodes 21 and 22 are respectively connected with targets 30 and 31. A steady negative potential is applied to the control grids 21 and 22.

In Fig. 12 I have shown the principal rectifier as including a common emitter comprising two sets of discharge electrodes 32 and 33 connected to one side of the output circuit of the rectifier. The principal rectifier in this arrangement includes separate targets 34 and 35 coacting with discharge electrodes 32 and 33 under control of control electrodes 21 and 22. Condensers 26 and 27 connect across control electrode 21 and discharge electrodes 32 and across discharge electrodes 33 and control electrode 22 respectively. Separate auxiliary rectifiers are employed for supplying biasing components. Control electrode 21 is biased by the auxiliary rectifier constituted by discharge electrodes 36 and coacting target electrode 37 connected in shunt with control electrode 21 and target electrode 34 of the principal rectifier. Control electrode 22 is biased by means of the auxiliary rectifier constituted by discharge electrodes 38 and target electrode 39 connected in shunt with control electrode 22 and target electrode 35 of the principal rectifier.

As illustrated in Fig. 13, the positions of the auxiliary rectifiers may be reversed so that the target electrode 37 connects with control electrode 28 while discharge electrode 36 connects with target electrode 34 in one portion of the full wave rectifier, while in the other portion of the full wave rectifier, target electrode 39 connects with control electrode 22 and discharge electrode 38 connects with target electrode 35.

In the arrangement illustrated in Fig. 12, a positive potential is applied to control electrodes 21 and 22 and maintained approximately steady by condensers 26 and 27.

In the arrangement shown in Fig. 13 a negative potential is applied to control electrodes 21 and 22 and maintained approximately steady by condensers 26 and 27. In the full wave rectifier circuits illustrated in Figs. 10, 11, 12 and 13, the rectified current may be smoothed out by any suitable arrangement of filter condensers.

In Fig. 14 I have illustrated a rectifier system embodying my invention and in which the potential supplied to the auxiliary rectifier 9—10 is obtained from a portion of the secondary winding 3 of the input transformer through a tapped connection 40 thereon. The applied alternating voltage E is substantially all transmitted through the condenser 12 and appears as a potential difference across discharge electrode 9 and target electrode 10. More current flows when discharge electrode 9 is negative than when it is positive so that a charge is maintained on condenser 12 which is applied as a bias potential on control electrode 8 of the principal rectifier. Control electrode 8 is therefore maintained at a steady or very nearly steady positive potential with respect to emitter 6.

In very high voltage rectifiers, cascading of the elements is used for further increasing the bias voltage as illustrated, for example, in Fig. 15. In this arrangement, I have represented the input transformer generally at 2 having primary winding 1 and secondary winding 3, the terminal 41 of which connects through a series of successive condenser stages shown at 42, 43, 44 and 45, etc. The opposite side 46 of secondary winding 3 connects through the discharge components illustrated at 47, 48, 49, 50 and 51, etc., in series. It will be observed that the discharge points of the discharge component 47 connect to one side of the line while the coacting target of discharge component 47 connects with the discharge points of succeeding discharge component 48, etc., and so on through the series of discharge components. Each pair of the discharge components are bridged by a condenser which I have illustrated at 52, 53, etc. The high voltage direct current is delivered at terminals 54. The dotted lines indicate that any number of successive stages may be employed. The high voltage rectifier as described herein may be used for biasing the control grid of a simple three-electrode rectifier of large dimensions. The total voltage obtained from the circuit of Fig. 15 is the voltage bias of one of the discharge components multiplied by the number of those components used in series. The circuit of Fig. 15 employs both half cycles of the transformer voltage.

Fig. 16 shows one arrangement of the circuit embodying the principles of my invention for effecting polyphase rectification. The polyphase supply circuit has been represented at 56, 57 and 58 connected in Y. Each branch of the Y-connected circuit includes an electron discharge device arranged in accordance with my invention which I have designated generally at 59, 60 and 61, each including a bank of emitters, a control electrode and a collector electrode. The control electrodes of the respective electron discharge devices are connected through condensers 62, 63 and 64 to tap connections 65, 66 and 67 of the branches of the Y-connected polyphase circuit. The rectified output is connected to circuit 68. A biasing component is supplied to each of the control electrodes by an auxiliary rectifier individual to each phase of the polyphase system as indicated at 69, 70 and 71. That is to say, the discharge electrode of the auxiliary rectifier in each case is connected to the target electrode of the principal rectifier and the target of the auxiliary rectifier is connected to the control electrode of the principal rectifier for impressing a biasing potential thereon. The principle of the operation is the same as that described in connection with Fig. 14. The emitters successively swing positive with respect to the collectors in accordance with the polyphase characteristics of the supply current. The D. C. positive potential of the control electrodes suppress the emission successively, thus giving rectification on each phase in succession.

In the several embodiments of my invention it will be understood that the rectification system of my invention operates at substantially atmospheric pressures and without the employment of customary high vacuum tubes. The condenser which I provide between two of the electrodes of the principal rectifier functions uniformly throughout the several embodiments of my invention to steady the potential on the control electrode of the principal rectifier, whereas the auxiliary rectifier functions uniformly to impress a biasing component upon the control electrode of the principal rectifier. I have shown various combinations in which the principles of my invention are employed, but I desire that it be understood that such disclosures are intended as illustrative of my invention and not as limiting my invention to any particular circuit arrangement. I realize that various modifications of my invention may readily be made and I intend no limitations upon my invention except as may be imposed by the scope of the appended claims.

Certain features of my invention not claimed herein are reserved and claimed in my copending and related applications.

What I claim as new and desire to secure by Letters Patent of the United States is as follows:

1. A high voltage rectifier comprising in combination, a discharge point, a control electrode and a target electrode maintained at substantially atmospheric pressure, a source of alternating current to be rectified, a connection from one side of said source to said discharge point, a connection from the other side of said source through a load to said target, means for maintaining said control electrode at a positive potential with respect to said discharge point for uni-directionally passing current from said target with respect to the load, and a condenser connected between said control electrode and said discharge point.

2. A high voltage rectifier comprising in combination, a discharge point, a control electrode and a target electrode maintained at substantially atmospheric pressure, a source of alternating current to be rectified, a connection from one side of said source to said discharge point, a connection from the other side of said source through a load to said target, means for maintaining said control electrode at a positive potential with respect to said discharge point for uni-directionally passing current from said target with respect to the load, and means connected between said control electrode and said discharge point for transmitting current from the target to the discharge point which does not exceed the value at which positive emission sets in from the discharge point.

3. A high voltage rectifier comprising in combination, a target electrode, a control electrode and a discharge point directed toward the target electrode and maintained under conditions of approximately atmospheric pressure, a source of alternating current connected at one end with said discharge point and connected at the other end through a load with said target, a condenser connected between said control electrode and said discharge point, an auxiliary rectifier comprising an auxiliary discharge point, and a spacially related auxiliary target maintained at substantially atmospheric pressure, a connection between said auxiliary discharge point and said control electrode, means for impressing a portion of the alternating current from said alternating current source across said auxiliary discharge point and said auxiliary target for deriving from said auxiliary rectifier a positive potential which is impressed upon said control electrode whereby current is uni-directionally passed with respect to said target to the load.

4. A high voltage rectifier comprising in combination, a target electrode, a discharge point and a control electrode disposed adjacent the discharge point and maintained at substantially atmospheric pressure, a source of alternating current connected at one end to said discharge point and at the other end through a load to said target, and means connected with said control electrode for preventing arc-back, said last mentioned means being excited from energy derived from said source of alternating current.

5. A high voltage rectifier comprising in combination, a target electrode, a discharge point and a control electrode disposed adjacent the discharge point, a source of alternating current connected at one end to said discharge point and at the other end through a load to said target, means connected with said control electrode for preventing arc-back, comprising an auxiliary discharge point disposed adjacent an auxiliary target under conditions of approximately atmospheric pressure, and means for impressing a portion of said alternating current from said source across said auxiliary discharge point and said auxiliary target for impressing a bias potential upon said control electrode.

6. A high voltage rectifier comprising in combination, a target electrode, a discharge point and a control electrode disposed adjacent the discharge point and maintained at substantially atmospheric pressure, a source of alternating current connected at one end to said discharge point and at the other end through a load to said target, means connected with said control electrode for preventing arc-back, comprising an auxiliary discharge point and a spacially related target maintained at substantially atmospheric pressure, a condenser connected between said control electrode and said first mentioned discharge point, a circuit extending through said condenser from said alternating current source to said auxiliary discharge point and said auxiliary target, means for controlling the alternating current supplied to said circuit, and means for impressing a biasing potential from said circuit upon said control electrode.

7. A polyphase rectifier comprising in combination with a polyphase power supply circuit, an electrode assembly individual to each phase of the polyphase power supply circuit including an emitter, a control electrode and a target, maintained at substantially atmospheric pressure, means for determining the potential of each of the control electrodes from that phase of the alternating current power supply with which the electrode assembly including the control electrode is associated, and a circuit common to all of the target electrodes for delivering rectified current to a load.

8. A polyphase rectifier comprising in combination with a polyphase power supply circuit, an electrode assembly individual to each phase of the polyphase power supply circuit including an emitter, a control electrode and a target, maintained at substantially atmospheric pressure, a connection through a condenser from the control electrode of each electrode assembly to that phase of the alternating current power supply with which the said assembly is associated, and a circuit common to all of the target electrodes for delivering rectified current to a load.

9. A high voltage rectifier comprising a power supply source of alternating current, a multiplicity of electric discharge gaps operative at substantially atmospheric pressure, a series circuit including said electric discharge gaps, paths having capacity elements therein connected in shunt with successive electric discharge gaps, and means for impressing the alternating current to be rectified across the successive electric discharge gaps for deriving rectified alternating current.

10. A high power rectifier comprising a multiplicity of electric discharge gaps connected in series and operative at substantially atmospheric pressure, a source of alternating current to be rectified connected in circuit with said electric discharge gaps, capacity elements connected across certain of said electric discharge gaps, and a circuit for supplying rectified current to a load connected across certain of said capacity elements.

11. A high power rectifier comprising in combination with an alternating current source, a multiplicity of electric discharge gaps arranged in a series path and operative at substantially atmospheric pressure, an output circuit for rectified current having a pair of terminals, a connection between the source of alternating current and one end of the series path including said electric discharge gaps, the other end of said path being connected to one terminal of said output circuit, the other terminal of said output circuit being connected to the other side of said alternating current source, condenser elements connected across said output circuit terminals and connected with certain of said electric discharge gaps, and additional condenser elements connected in shunt with selected electric discharge gaps.

12. A high potential rectifier comprising in combination with a source of alternating current to be rectified, a series path connected to one end of said source and including a multiplicity of electric discharge gaps operative at substantially atmospheric pressure, a series path connected with the other end of said alternating current source and including a multiplicity of condenser elements, output terminals for delivering rectified current to a load connected across a group of said condenser elements, connections between certain of said condenser elements and certain groups of said electric discharge gaps, and additional condensers connected in shunt with pairs of said electric discharge gaps.

13. In a high power rectifier, a bank of emitters, control and target electrodes maintained at substantially atmospheric pressure, a source of alternating current, a connection between one end of said source and said bank of emitters, a capacitive connection between said control electrode and said source of alternating current, means associated with said control electrode for rectifying the alternating current potential applied to said control electrode through said capacitive connection, and an output circuit connected with said target electrode and one side of said alternating current source.

14. A high power rectifier maintained at substantially atmospheric pressure and comprising in combination a bank of emitters, control and target electrodes, an alternating current source, means for exciting said bank of emitters and said control electrode according to the cyclic changes of the alternating current source, means associated with said control electrode for rectifying the alternating current potential applied to said control electrode, and an output circuit connected with said target electrode and one side of said alternating current source for deriving rectified current by the coaction of said bank of emitters and said control electrode with respect to said target electrode.

15. In a high power rectifier system, an alternating current source, a bank of emitting electrodes, control and target electrodes maintained at substantially atmospheric pressure, means for cyclically exciting said bank of emitting electrodes and said control electrode from said source of alternating current, means associated with said control electrode for rectifying the alternating current potential applied to said control electrode, and an output circuit connected at one end with said target electrode and at the other end with said source of alternating current.

16. A high power rectifier system maintained at substantially atmospheric pressure and comprising in combination with a source of alternating current, a bank of emitting electrodes, a control electrode cooperative with the bank of emitting electrodes, a target electrode associated with the aforesaid electrodes, connections between said bank of emitting electrodes and said control electrode and said source of alternating current for cyclically changing the polarity of said bank of emitting electrodes and said control electrode according to the cyclic changes in the alternating current supplied thereto, means associated with said control electrode for rectifying the alternating current potential applied to said control electrode for effecting electric discharge from said bank of emitting electrodes with respect to said target electrode uni-directionally, and a circuit between said target electrode and said source of alternating current for supplying rectified current to a load.

17. In a full wave rectifier system, an input circuit including a transformer having a primary winding coupled with a secondary winding, sets of discharge electrodes directed toward each other under conditions of substantially atmospheric pressure, one set of said discharge electrodes being connected with one end of said secondary winding and the other set of said discharge electrodes being connected with the opposite end of said secondary winding, a target electrode intermediate said sets of discharge electrodes, a control electrode disposed between each set of discharge electrodes and said target electrode, a condenser connected between each set of discharge electrodes and the associated control electrode, biasing component devices disposed between an intermediate point in said secondary winding and said control electrodes, and an output circuit connected between the said intermediate point in said secondary winding and said target.

18. In a full wave rectifier system, an input circuit including a transformer having a primary winding coupled with a secondary winding, sets of discharge electrodes directed toward each other under conditions of substantially atmospheric pressure, one set of said discharge electrodes being connected with one end of said secondary winding and the other set of said discharge electrodes being connected with the opposite end of said secondary winding, a target electrode intermediate said sets of discharge electrodes, a control electrode disposed adjacent each set of discharge electrodes and said target electrode, a condenser connected between each set of discharge electrodes and the associated control electrode, auxiliary rectifiers constituted by a group of discharge electrodes connected to an intermediate point in said secondary winding, and separate target electrodes individually connected with the said control electrodes for impressing a predetermined potential upon said control electrodes, and an output circuit connected between said target electrode and the intermediate point in said secondary winding.

19. A full wave rectifier comprising in combination with an input circuit, a transformer having a primary winding and a secondary winding, a set of groups of discharge electrodes, separate target electrodes associated with the groups of discharge electrodes, a connection between one target electrode and one end of said secondary winding, a connection between the other target electrode and the opposite end of said secondary winding, a control electrode disposed between each group of discharge electrodes and the associated target electrode, said electrodes being operative under conditions of substantially atmospheric pressure, a condenser connected between each control electrode and the groups of discharge electrodes, an auxiliary rectifier disposed between each control electrode and the associated target electrode, and an output circuit connected between said set of groups of discharge electrodes and an intermediate point in said secondary winding.

20. A full wave rectifier comprising in combination with an input circuit, a transformer having a primary winding and a secondary winding, a set of groups of discharge electrodes, separate target electrodes associated with the groups of discharge electrodes, a connection between one target electrode and one end of said secondary winding, a connection between the other target electrode and the opposite end of said secondary winding, a control electrode disposed between each group of discharge electrodes and the associated target electrode, said electrodes being operative under conditions of substantially atmospheric pressure, a condenser connected between each control electrode and the groups of discharge electrodes, a biasing component constituted by a group of discharge electrodes and an associated target, each biasing component having the associated target thereof connected with one control electrode and the group of discharge electrodes thereof connected with an individual one of said first mentioned targets, and an output circuit connected between said set of groups of discharge electrodes and an intermediate point in said secondary winding.

21. A high voltage rectifier operative under conditions of substantially atmospheric pressure, comprising means for producing an alternating current electric discharge unsymmetrical in the alternate phases of opposite polarity, auxiliary means for producing a like electric discharge, and control means disposed in the field of the first said discharge and connected with said auxiliary means, said auxiliary means being operative to impress a bias voltage on said control means for suppressing the minor phase of the discharge in the first said means and increasing the resultant unidirectional current in the major phase of said discharge.

22. A high voltage rectifier operative under conditions of substantially atmospheric pressure, comprising means for producing an alternating current electric discharge asymmetrical in the alternate phases of opposite polarity, auxiliary means for producing a like electric discharge and including a condenser having a difference of potential thereacross proportional to the asymmetry of the auxiliary discharge, and control means disposed in the field of the first said discharge and connected with said condenser, said condenser with the difference of potential thereacross constituting a source of bias potential for said control means, whereby the first said means produces unidirectional current through the negative phase of said discharge and the positive phase of said discharge is suppressed by the operation of said control means.

23. A high voltage rectifier operative under conditions of substantially atmospheric pressure, comprising means for producing an alternating current electric discharge asymmetrical in the alternate phases of opposite polarity, said means including a condenser having a substantially constant difference of potential thereacross proportional to the asymmetry of the discharge, said condenser with the difference of potential thereacross constituting a source of rectified alternating current.

WILLARD H. BENNETT.